United States Patent
Kaneko et al.

[11] Patent Number: 5,829,768
[45] Date of Patent: Nov. 3, 1998

[54] ARM AND PROCESS FOR FORGING THE SAME

[75] Inventors: Kozo Kaneko; Keisuke Kurumatani; Shin Sakurada; Masatoshi Kimura, all of Toyota, Japan

[73] Assignee: Toyota Jidosha Kabushiki Kaisha, Toyota, Japan

[21] Appl. No.: 636,956

[22] Filed: Apr. 24, 1996

[30] Foreign Application Priority Data

Apr. 28, 1995 [JP] Japan .................................... 7-105784

[51] Int. Cl.$^6$ ...................................................... B60G 7/00
[52] U.S. Cl. .......................... 280/96.1; 280/691; 280/675
[58] Field of Search ........................... 280/691, 93, 96.1, 280/675, 690; 29/34 R

[56] References Cited

U.S. PATENT DOCUMENTS

| | | | |
|---|---|---|---|
| 1,924,586 | 8/1933 | Zerk | 280/96.1 |
| 4,192,396 | 3/1980 | Austermann, Jr. et al. | 180/252 |
| 5,310,210 | 5/1994 | Delbeke et al. | 280/673 |
| 5,322,317 | 6/1994 | Kusaka et al. | 280/673 |
| 5,516,130 | 5/1996 | Mitchell | 280/96.1 |
| 5,662,348 | 9/1997 | Kusama et al. | 280/685 |
| 5,662,349 | 9/1997 | Hasshi et al. | 280/690 |

FOREIGN PATENT DOCUMENTS

| | | |
|---|---|---|
| U-58-163302 | 10/1983 | Japan . |
| A-58-218407 | 12/1983 | Japan . |
| A-62-53285 | 3/1987 | Japan . |
| A-2-169312 | 6/1990 | Japan . |
| U-3-50505 | 5/1991 | Japan . |
| A-3-193512 | 8/1991 | Japan . |
| A-5-220535 | 8/1993 | Japan . |
| A-6-571 | 1/1994 | Japan . |
| A-6-255332 | 9/1994 | Japan . |

OTHER PUBLICATIONS

Patent Abstracts of Japan, vol. 8, No. 73 (M–287), Apr. 5, 1984.
Patent Abstracts of Japan, vol. 15, No. 457 (M–1181), Nov. 20, 1991.
Patent Abstracts of Japan, vol. 11, No. 241 (M–614), Aug. 7, 1987.
Patent Abstracts of Japan, vol. 18, No. 190 (M–1586), Mar. 31, 1994.
Patent Abstracts of Japan, vol. 95, No. 8, Aug. 15, 1995.

*Primary Examiner*—Christopher P. Ellis
*Attorney, Agent, or Firm*—Oliff & Berridge, PLC

[57] ABSTRACT

An arm for a vehicle suspension has at least two connecting portions and a communicating portion. The at least two connecting portions are connectable to a vehicle suspension. The communicating portion communicates each of the at least two connecting portions and receives a bending force. The communicating portion has at least three beam portions that extend along a communicating direction of the communicating portion and do not exist in the same plane. Accordingly, it is possible to secure enough strength against a bending force, as well as, to forge an arm whose weight was reduced without impairing the required characteristics.

20 Claims, 9 Drawing Sheets

Fig. 7
(A) 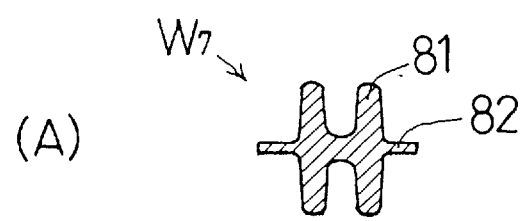
(B) 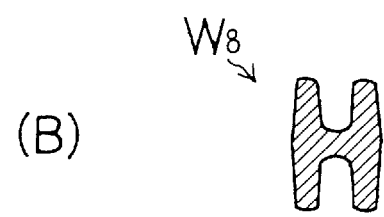
(C) 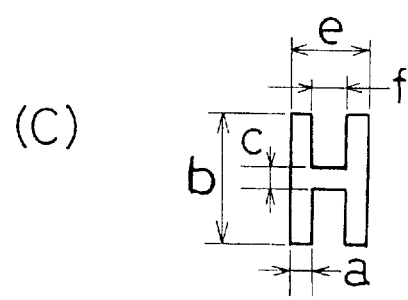

Fig. 10
13o 
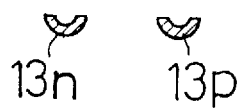
13n   13p
Fig. 11
13r 
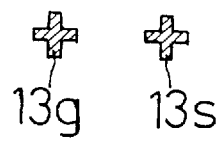
13q   13s

5,829,768

ARM AND PROCESS FOR FORGING THE SAME

BACKGROUND OF THE INVENTION

1. Field of Invention

The present invention relates to an arm and process for forging the same. In particular, the present invention relates to an arm that is suitable for use in a suspension of a vehicle as an upper arm, a lower arm or as a knuckle that connects these arms.

2. Description of Related Art

As the conventional arm, for example as a knuckle, the arms shown in FIGS. 12 to 14 have been known. This knuckle 90, as shown in FIG. 12 and 14, comprises: two connecting portions 91 and 92 having bolt holes 91a and 92a respectively; a communicating portion 93 that communicates each of the connecting portions 91 and 92. In this knuckle 90, a boss portion 94 is formed at the side of the connecting portion 92 of the communicating portion 93; and an axial hole 94a is penetrated through this boss portion 94. Also, at the boss portion 94 side of the communicating portion 93 and at the part adjacent to the connecting portion 92, brackets 95 and 96, into which bolt holes 95a and 96a are penetrated, respectively, are provided so as to project; and a bearing surface 94b is formed at the side of the boss portion 94.

By using this knuckle 90, when the part of the suspension at the front side of a vehicle, as shown in FIG. 15, is composed, as shown in FIGS. 12 and 14, an upper arm 91A is connected to the connecting portion 91 through a bolt hole 91a; and a lower arm 92A is connected to the connecting portion 92 through a bolt hole 92a. At the axial hole 94a of the boss portion 94, a bearing, which is not shown in the Figure, is provided so that a wheel of a tire T is rotatably supported. At each of the brackets 95 and 96, brake calipers, not shown, are fixed through the bolt holes 95a and 96a; and an ABS (Antilock Brake System) sensor is provided at the bearing surface 94b. Accordingly, in a vehicle having the above-mentioned suspension, a bending force is generated by the tire T and is received by the communicating portion 93.

However, the conventional knuckle 90 has the following disadvantages. In order to secure enough strength against the bending force, as shown in FIG. 13, the conventional knuckle 90 comprises the communicating portion 93 shaped in almost a round shape whose cross section is solid; (i.e., the neutral axis passes through material); so that the conventional knuckle 90 is weighted. Thus, the weighted knuckle 90 causes an increase in spring load; therefore the weightiness of a vehicle brings some harmful effects such as deterioration of fuel economy and deterioration of suspension characteristics.

In addition to this knuckle 90, there is an arm that comprises: at least two connecting portions that are connected to a mating member; a communicating portion that connects each of at least two connecting portions; and receives the bending force at the communicating portion. In order to secure enough strength against the bending force, the communicating portion is weighted because the cross sections of the communicating portion is solid and almost round in shape. This weightiness of the communication portion causes various disadvantages.

In this conventional arm, in order to secure enough strength against the bending force, as well as, to make the arm as light as possible, it is assumed that the communicating portion has a high section modulus and is preferably hollow shaped. Also as for a lower arm described in Japanese Unexamined Utility Model Publication No. 58-163302, it may be assumed that the cross section of the communicating portion is almost an I shape having a high section modulus.

However, methods for forming an arm whose communicating portion is hollow are limited to: a method for forming the communicating portion by casting; a method for forming the communicating portion by bonding of a plurality of members; and a method for forming the communication portion by cutting the central portion of the solid member formed by forging and so on. This is because if the arm whose communicating portion is hollow is formed only by forging, it is forged by using forging pressure that is parallel to the communicating direction, so that considerably higher forging pressure is generally necessary in order to form the long, hollow communicating portion and it is not possible in actual cases. If the communicating portion is formed by casting, the arm having this communicating portion, as a whole, unfavorably has nonuniform metallographic structure and weak toughness. Moreover, if the communicating is formed by bonding, the bonding portion of the arm having this communicating portion exists so that the communicating portion receives the bending force. Furthermore, if the communicating portion is formed by cutting, the arm having this communicating portion may have flaws at the time of cutting. As mentioned above, it is hard to obtain an arm whose communication portion is hollow and possesses the required characteristics by the present technique.

In this respect, if the cross section of the communication portion is almost an I shape, it may be possible to form this arm only by forging.

However, in order to secure the higher section modulus, in the arm whose height of rib rising from web is increased and whose cross section is an I shape, the high forging pressure required may cause forging to be more difficult. Furthermore, in this arm, there may be some forging defects such as wrinkles and flaws at the portion from which the rib is rising up. In this way, it is hard to obtain an arm having a communicating portion whose cross section is an I shape and possesses the required characteristics, including sufficient bending strength.

SUMMARY OF THE INVENTION

The first object of the present invention is to secure enough strength against the bending force, as well as to lighten the arm without impairing the required characteristics.

The second object of the present invention is to forge a lighter arm, as well as, to secure enough strength against the bending force without impairing the required characteristics.

The arm comprises: at least two connecting portions that are connected to a mating member; and a communicating portion having a longitudinal axis that communicates each of the at least two connecting portions; wherein the arm receives the bending force at the communicating portion that has at least three beam portions that extend along the longitudinal axis and do not exist in the same plane.

The process for forging the arm comprises the steps of:

forming at least two connecting portions that are connected to a mating member, and a communicating portion having a longitudinal axis and at least three beam portions that communicate with each of the at least two connecting portions that extend along the longitudinal axis and exist in the same plane; and bending the communication portion having at least three beam portions that do not exist in the same plane by bending the at least three beam portions of the communicating portion by using bending pressure.

Between the forging process and the bending process it is possible to conduct a deburring process of deburring the forged products after the forging process.

In the arm, by having at least three beam portions that extend along the longitudinal axis and do not exist in the same plane, a neutral axis exists at the space between each beam portion and the section modulus at the space between each beam portion is high. Namely, because there are at least three beam portions, even if each beam extends along the longitudinal axis, the shape is such that the at least three beam portions do not exist in the same plane. And therefore, this arm secures enough strength against the bending force and becomes lighter by decreasing the quantity of materials at the space between each beam portion.

In the forging process, each connecting portion and communicating portion are formed. At this time, by forging in the direction that is perpendicular to the longitudinal axis, even if the communicating portion is long, and even if the at least two connecting portions are thicker than the communicating portion, it is possible to forge each connecting portion and communicating portion.

Then, by the bending process, the at least three beam portions of the communicating portion are bent by the bending pressure. Owing to this, each beam portion does not exist in the same plane and the communicating portion that receives the bending force is formed.

After the bending step, if the bolt holes are necessary at the connecting portions, the bolt holes are formed by cutting without damaging the arm characteristics.

The arm obtained in this way is formed by forging, the metallographic structure is uniform and strong. At the same time, the bending strength at the communicating portion that receives the bending force is not impaired. By comparing the case in which the communicating portion is in almost I shape, a higher section modulus is obtained and high forging pressure is not required, therefore forging can be conducted easily and forging defects are hard to generate. Accordingly, this arm secures enough strength against the bending force. Additionally, by decreasing the quantity of material at the space between each of the at least three beam portions the arm has a lighter weight.

The bolt holes that are out at the at least two connecting portions, if necessary, do not receive the bending force at the at least two connecting portions and the arm characteristics are not impaired.

As described above, it is possible to secure enough strength against the bending force, as well as, to make a light weight arm without damaging the required characteristics.

In the method for forging an arm, it is possible to secure enough strength against the bending force, as well as, to forge an arm whose weight is reduced without impairing the required characteristics.

BRIEF DESCRIPTION OF THE DRAWINGS

A more complete appreciation of the present invention and its advantages will be readily obtained as the invention becomes better understood by reference to the following detailed description when considered in connection with the accompanying drawings and detailed specification, all of which forms a part of the disclosure:

FIG. 1 relates to a First Preferred Embodiment: (A) is a cross-sectional view of a forging die and so on; (B) is a cross-sectional view of a deburring die and so on; and (C) is a cross-sectional view of a bending die and so on;

FIG. 7 relates to a knuckle in Comparative Example 2: (A) is an end face view after the forging in the same way as that of FIG. 3; (B) is an end face view after deburring in the same way as that of FIG. 3; and (C) is a view of section modulus model;

FIG. 10 relates to the knuckle in the Fourth Preferred Embodiment and it is an end face view in the same way as that of FIG. 3;

FIG. 11 relates to a knuckle in a Fifth Preferred embodiment and is an end face view in the same way as that of FIG. 3;

DETAILED DESCRIPTION OF PREFERRED EMBODIMENTS

Having generally described the present invention, a further understanding can be obtained by reference to the specific preferred embodiments that are provided for purposes of illustration only and are not intended to limit the scope of the appended claims.

Hereinafter, the present invention will be concretely described by way of Preferred Embodiments 1 to 6 and by reference to the figures.

First Preferred Embodiment

In a First Preferred Embodiment, the knuckle is formed by the forging process. (Forging Process)

Figure 1:
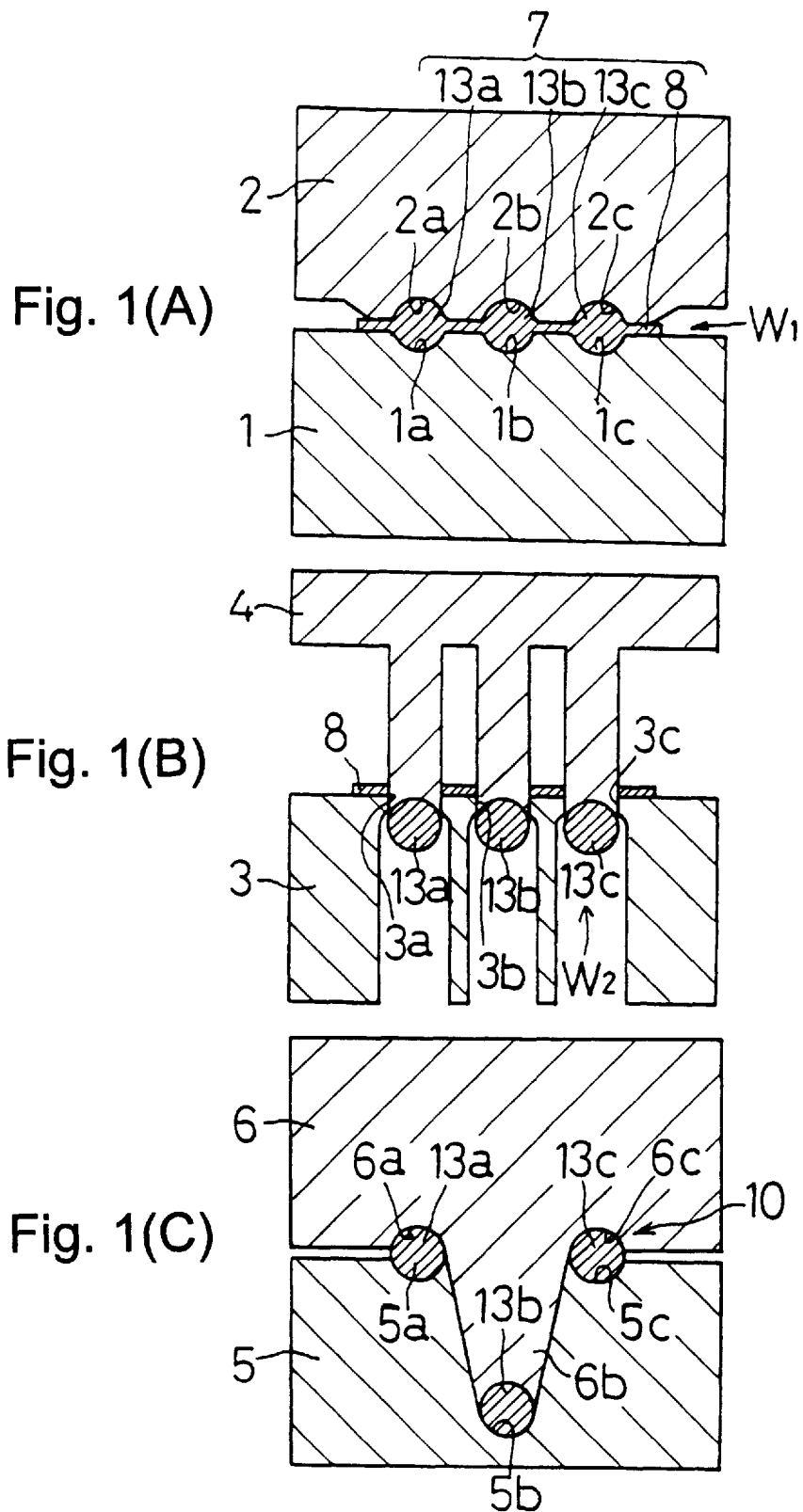

As shown in FIG. 1 (A), a forging die comprising a lower die 1 and a upper die 2 was prepared. At the upper surface of the lower die 1, three concave portions 1a to 1c whose cross sections are in semi-sphere shape are provided in parallel; and also at the the lower surface of the upper die 2, three concave portions 2a to 2c that are facing each of concave portions 1a to 1c and whose cross sections are in semi-sphere shape are provided in parallel. These concave portions 1a to 1c and 2a to 2c are near the boss portion 14 side of a communicating portion 13 that has relatively higher freedom of design in the communicating portion 13 of a knuckle 10 in the First Preferred Embodiment shown in FIGS. 2 and 4.

A raw material in plate shape was installed on the upper surface of the lower die I of the forging die shown in FIG. 1 (A), and the raw material was forged by lowering the upper die 2 and by a predetermined forging pressure. Thus forged product $W_1$ has two connecting portions 11 and 12 (refer to FIGS. 2 and 4) and a communicating portion 7 that communicates each of connecting portions 11 and 12. The communicating portion 7 comprises three beam portions 13a to 13c and burrs 8 that exist between each of the rough beam portions 13a to 13c and at the side surfaces of the rough beam portions 13a and 13c.

At that time, by the forging pressure in the up and down direction that is perpendicular to the longitudinal axis, even if the desired communicating portion 13 of the knuckle 10 is long, and even if the connecting portions 11 and 12 are in shapes having a boss portion 14 that is thicker than the communicating portion 13, each of the connecting portions 11 and 12 and the communicating portion 7 can be forged.
(Deburring Process)

Next, as shown in FIG. 1 (B), a die for deburring that comprises a lower die 3 and an upper die 4 was prepared. At the lower die 3, three through holes 3a to 3c are provided up and down in parallel respectively; and at the upper die 4, three convex portions 4a to 4c that can be contained in each of through holes 3a to 3c are projectionally provided in parallel. The tip surfaces of each of convex portions 4a to 4c are concave shaped and whose cross section is in semi-sphere shape.

On the upper surface of the lower die 3 of this deburring die, a forged product $W_1$, was mounted; and burrs 8 were removed from the forged product $W_1$ by lowering the upper die 4 so that the deburred product $W_2$ was obtained.
(Bending Process)

Then, as shown in FIG. 1 (C), a bending die comprising a lower die 5 and an upper die 6 was prepared. At the lower die 5, one stick of concave portion 5b having a bottom surface whose cross section is in semi-sphere shape is provided; and at the upper surface of the lower die 5, concave portion 5a and 5c that are adjacent to the concave portion 5b and whose cross sections are in semi-sphere shapes are provided in parallel to the concave portion 5b respectively. At the upper die 6, one stick of convex portion 6b that can be contained in the concave portion 5b and whose tip surface has the semi-sphere shaped cross section is provided so as to project; and at the lower surface of the upper die 6, concave portions 6a and 6c that face concave portions 5a and 5c and whose cross sections are in semi-sphere shapes are provided so as to be in parallel to the convex portion 6b respectively and so as to be in concave shapes.

On the upper surface of the lower die 5 of this bending die, the deburred product $W_2$ was mounted; and rough beam portions 13a to 13c of the communicating portion 7 were bent by lowering the upper die 6 and by the predetermined bending pressure. By doing this, as shown in the communicating portion 13 (refer to FIGS. 2 and 4) of FIG. 3, each of beam portions 13a to 13c were expanded at intervals of 120° C. so as to not exist in the same plane. The diameter d of each of beam portions 13a to 13c is 16 mm and the diameter D of the concentric circle (shown in two dotted chain line) formed by each of beam portions 13a to 13c is set to be 53 mm.

Figure 2:
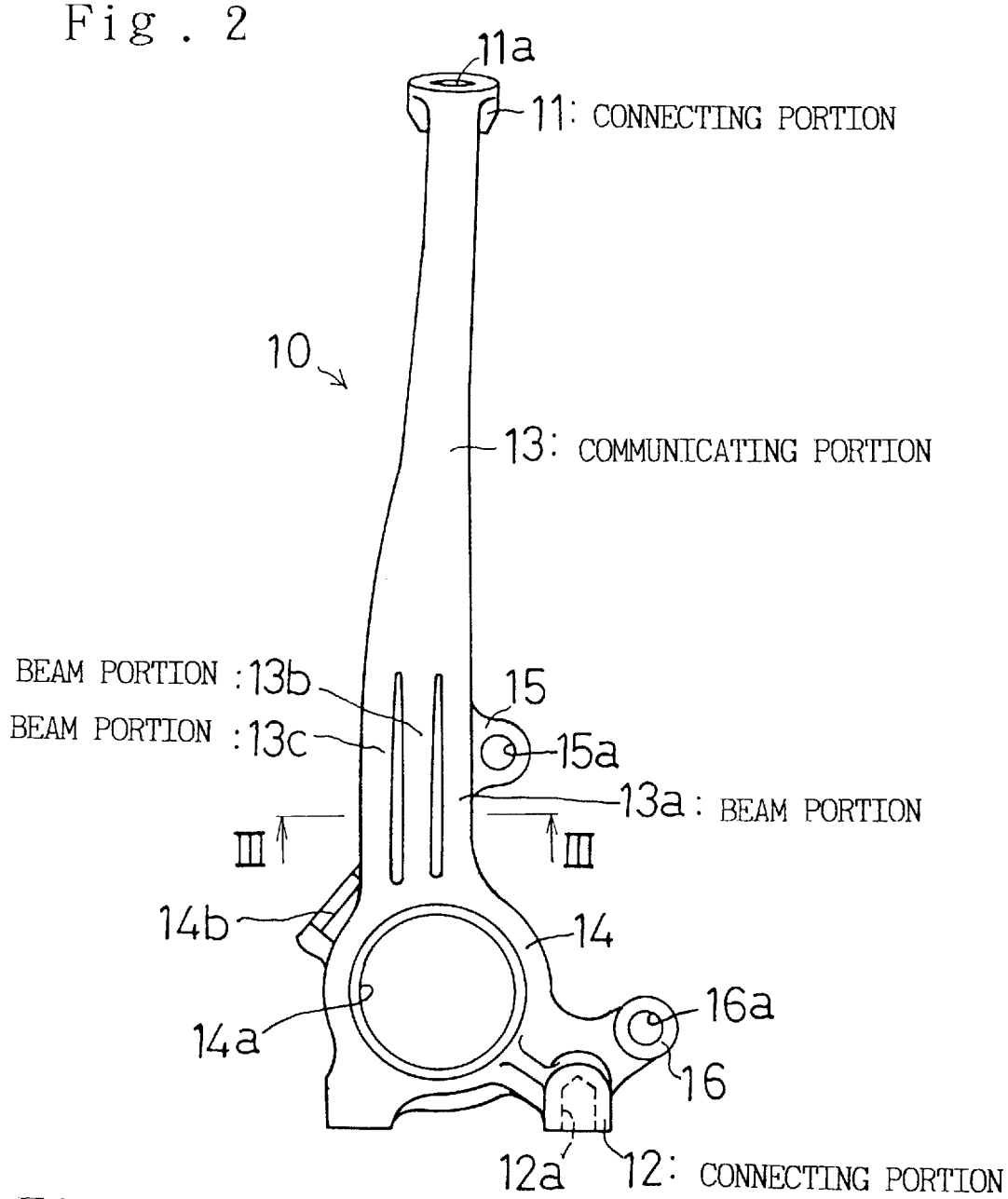
FIG. 2 is a plan view of a knuckle in the First Preferred Embodiment.
Figure 4:
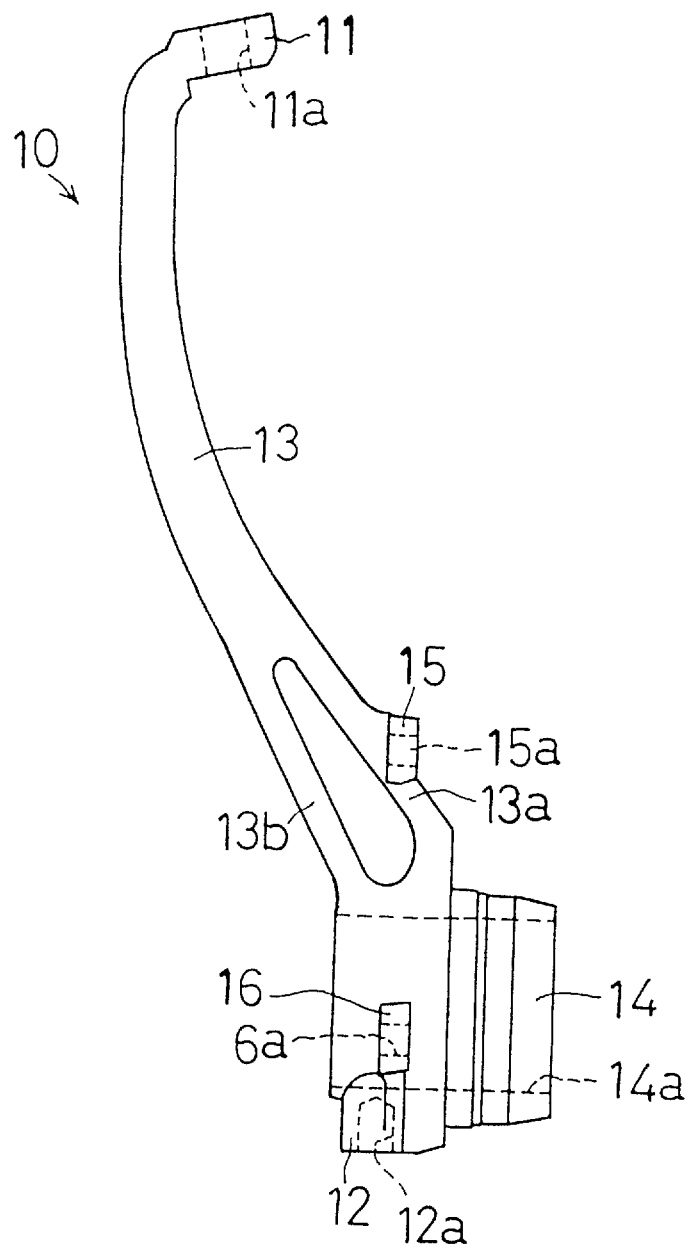
FIG. 4 is a side view of the knuckle in the First Preferred Embodiment.

After that, by cutting, as shown in FIGS. 2 and 4, bolt holes 11a, 12a, 15a and 16a, at the connecting portions 11 and 12, and brackets 15 and 16 were formed in the predetermined diameters; and an axial hole 94a was formed at boss portion 14 so as to have the predetermined diameter. Furthermore, a bearing surface 14b is cut at the side of the boss portion 14.

Figure 3:
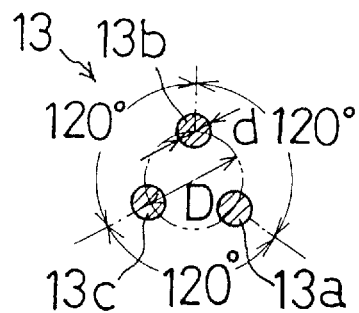
FIG. 3 relates to the knuckle of the First Preferred Embodiment and is an end face view of FIG. 2.

In this knuckle 10, the shape shown in FIG. 3 was set to be section modulus model so that the section modulus was calculated. As a result, in this knuckle 10, the section modulus was set to 7155 mm³ when any of the beam portions 13a to 13c were raised in the up and down bending, and the section modulus was set to 6419 mm³ when any of the beam portions 13a to 13c were raised in the right and left bending.

Also in this knuckle 10, the shape shown in FIG. 3 was set to be section modulus model so that the cross-section area that corresponds to the weight was calculated. As a result, in this knuckle 10, the cross-section area was 603 mm².

Second Preferred Embodiment

In a Second Preferred Embodiment, the arm was formed by another method. The same constructions are marked by the same reference numbers.
(Forging Process)

Figure 5A:
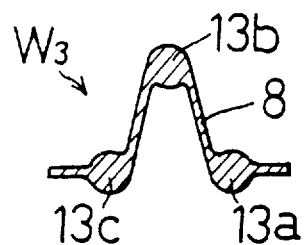
FIG. 5 relates to a knuckle in a Second Preferred Embodiment: (A) is an end face view after the forging in the same way as that of FIG. 3; and (B) is an end face view after deburring in the same way as that of FIG. 3.
Figure 5B:
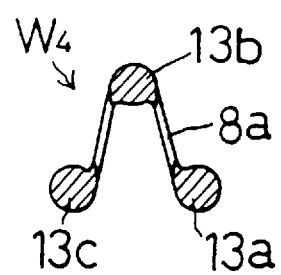

By a general forging process, a forged product $W_3$ shown in FIG. 5 (A) was obtained. This forged product $W_3$ comprises: three beam portions 13a to 13c that do not exist in the same plane; and burrs 8 that exist between each of the at least three beam portions 13a to 13c and at the side surfaces of raw material the beam portions 13a and 13c. The other portions of the connecting portions 11 and 12 and the communicating portion 13 are not shown in Figures.

At that time, also by the forging force of the up and down direction that is perpendicular to the longitudinal direction, each of the connecting portions 11 and 12 and the communicating portion 13 can be forged.
(Deburring Process)

Next, by a general deburring process, a deburred product $W_4$ that is shown in FIG. 5 (B) was obtained. This deburred product $W_4$ was formed by removing window portions 8a from burrs 8 in the forged product $W_3$. This burred product $W_4$ was formed by a cutting process so that a knuckle was obtained.

In this knuckle, the section modulus model is the same that of the First Preferred Embodiment so that the section modulus and the cross-section area are the same as those in First preferred Embodiment.

Comparative Example 1

Figure 12:
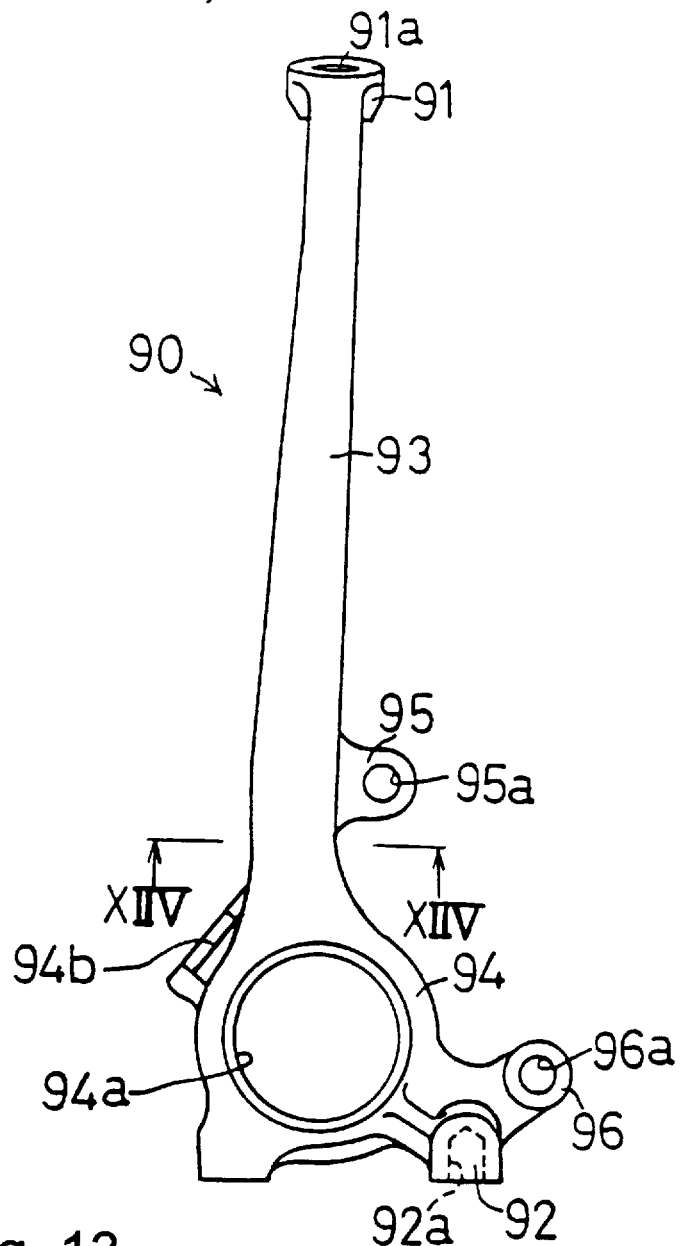
FIG. 12 is a plan view of the conventional knuckle.
Figure 13:
FIG. 13 relates to the conventional knuckle and a end face view of FIG. 12.
Figures 14, 15:
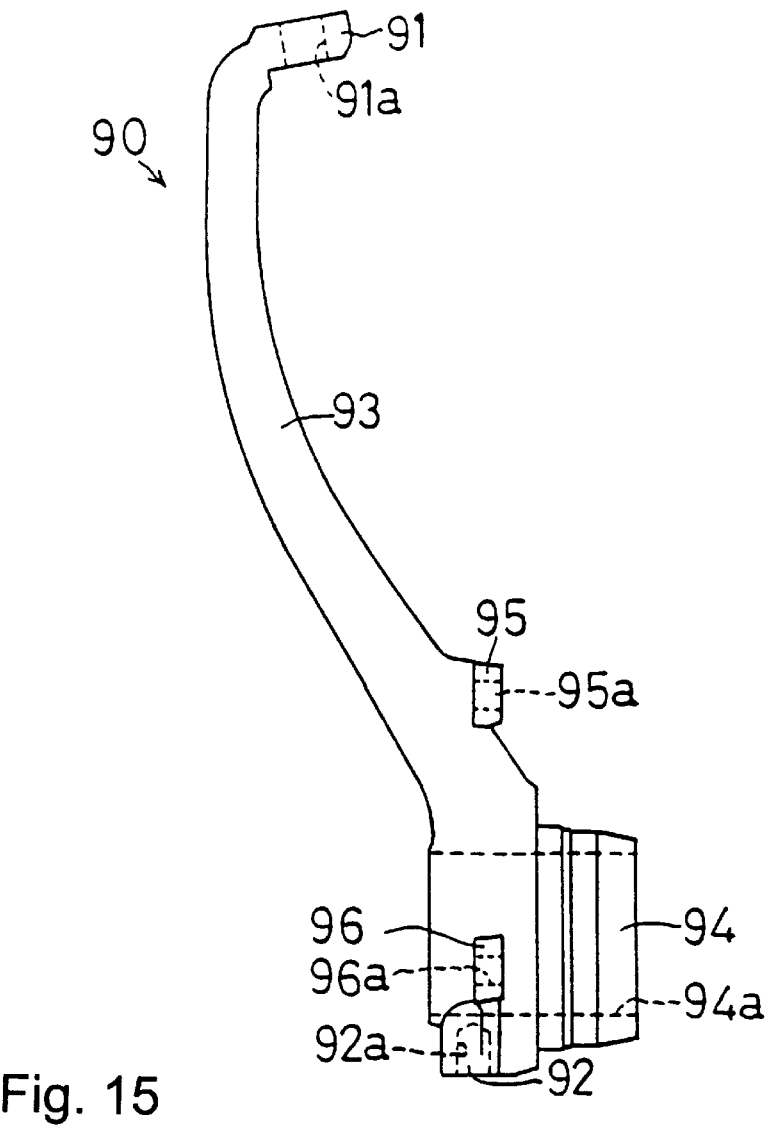
FIG. 14 is a side view of the conventional knuckle.
FIG. 15 is a perspective view showing a part of the suspension at the front side of a vehicle.

In a Comparative Example 1, the conventional knuckles shown in FIG. 12 to 14 are formed by the conventional methods. The same elements are marked by the same reference numbers.
(Forging Process)

Figure 6A:
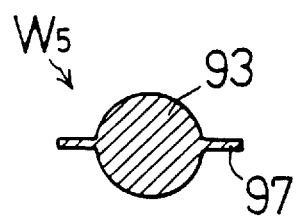
FIG. 6 relates to a knuckle in Comparative Example 1: (A) is an end face view after the forging in the same way as that of FIG. 3; and (B) is an end face view after deburring in the same way as that of FIG. 3.
Figure 6B:
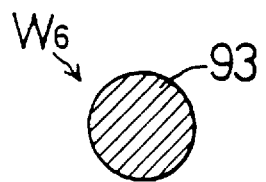

By a general forging process, a forged product $W_5$ that is shown in FIG. 6 (A) was obtained. This deburred product $W_5$ comprises: a communicating portion 93 whose cross section is solid and was molded in an almost circular shape; and burrs 97 exist on the side surfaces of this communicating portion 93. The other portions of the connecting portions 11 and 12 and the communicating portion 93 are not shown in Figures.
(Deburring Process)

Next, by a general deburring process, a deburred product $W_6$ which is shown in FIG. 6 (B) was obtained. This deburred product $W_6$ was formed by removing burrs 97 from the forged product $W_5$. This burred product $W_6$ was formed by a cutting process so that a knuckle was obtained.

In this knuckle, the circular shape, whose diameter is 40 mm, was set to be the section modulus model and the section modulus and the cross-section area were calculated. As a result, in this knuckle, the section modulus was 6283 mm$^3$ and the cross-section area was 1257 mm$^2$.

Comparative Example 2

In a Comparative Example 2, the communicating portion of the knuckle was molded in a shape whose cross section is almost an I. The same elements are marked by the same reference numbers.

(Forging Process)

By a general forging method, a forged product $W_7$, which is shown in FIG. 7(A), was obtained. This forged product $W_7$ comprises: a communicating portion 81 that was formed in a shape whose lateral cross section is an I shape, that is, in which two sticks of ribs are extending in parallel; and burrs 82 exist at the side surface of this communicating portion 81. The other portions of the connecting portion 11 and 12 and the communicating portion 81 are not shown in Figures.

(Deburring process)

Next, by a general deburring process, a deburred product $W_8$, shown in FIG. 7 (B), was obtained. This deburred product $W_8$, was formed by removing burrs 82 from the forged product $W_7$. This deburred product $W_8$, was formed by a cutting process so that a knuckle was obtained.

In this knuckle, the shape shown in FIG. 7 (C) was set to be the section modulus model and the section modulus and the cross-section area were calculated (a =8 mm, b=48.5 mm, c=8 mm, e=29 mm and f=13 mm). As a result, the section modulus of this knuckle was 6296 mm$^3$ in the up and down bending, 6287 mm$^3$ in the right and left bending and the cross-section area was 880 mm$^2$.

Evaluation

The section modulus and cross-section area of the First and Second Preferred Embodiments and Comparative Examples 1 and 2 are shown in Table 1.

TABLE 1

| | section modulus (mm$^3$) | difference (mm$^3$) | cross section area (mm$^2$) | difference (%) |
|---|---|---|---|---|
| First Preferred Embodiment | 7155 6419 | +872 +136 | 603 | −52 |
| Second Preferred Embodiment | 7155 6419 | +872 +136 | 603 | −52 |
| Comparative Example 1 | 6283 | reference | 1257 | reference |
| Comparative Example 2 | 6296 6287 | +13 +4 | 880 | −36 |

As is clear from Table 1, section modulus of the knuckles of the First and Second Preferred Embodiments are higher than those of the Comparative Examples 1 and 2 in which the cross section of the communicating portion 13 is solid and almost circular in shape or the cross section thereof is almost an I shape. Also, when the First and Second Preferred Embodiment are compared with Comparative Examples 1 and 2, the materials at the spaces between each of the beam portions 13a to 13c, and the weight of the knuckles of the First and Second Preferred Embodiment can be reduced.

Since the knuckles of the First and Second Preferred Embodiments were obtained mainly by forging and bending caused by the bending pressure, the metallographic structure is uniform and strong as a whole, and at the same time, it is clear that the bending strength of the communicating portion 13, at which the bending force is received, is not impaired. Because the bolt 11a is cut at the connecting portion 11, the bending force is not received at the connecting portion 11 so that the characteristics is not damaged.

Furthermore, it is easy to forge the knuckles of the First and Second Preferred Embodiments without needing a high forging pressure and at the same time, forging defects are hard to generate.

Accordingly, in the knuckles of the First and Second Preferred Embodiment, in which the necessary strength against bending force is secured and the weight of the knuckle is reduced, are applied to a suspension, spring load can be reduced, fuel consumption is improved, and the suspension characteristics are improved.

Third Preferred Embodiment

Also in a Third Preferred Embodiment, the knuckle is formed by the forging method.

Figure 8A:
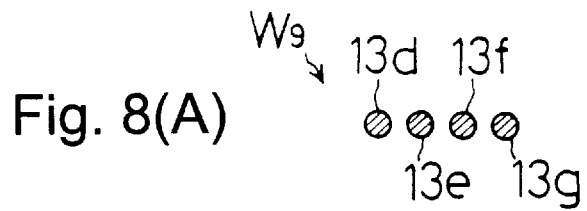
FIG. 8 relates to a knuckle in a Third Preferred Embodiment: (A) is an end face view after the forging in the same way as that of FIG. 3; and (B) is an end face view after deburring in the same way as that of FIG. 3.
Figure 8B:
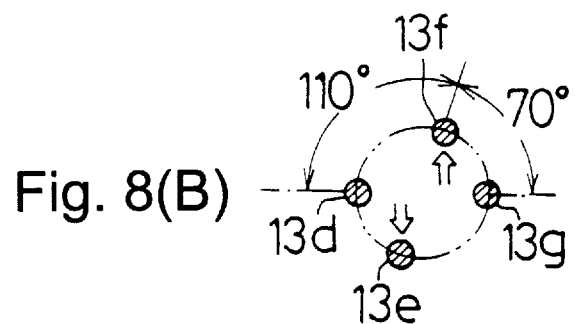

Undergoing the same forging process and the deburring process as the First Preferred Embodiment, a deburred product $W_9$, shown in FIG. 8 (A), was obtained. This deburred product $W_9$ comprises four sticks of beam portions 13d to 13g. The other portions of the connecting portions 11 and 12 and the communicating portion are not shown in Figures.

Next undergoing the same bending process and cutting process as the First Preferred Embodiment, a knuckle, shown in FIG. 8 (B), was obtained. In this knuckle, the beam portions 13e and 13f are bent toward the arrow directions respectively so that the space between the beam portions 13d and 13f and the space between the beam portions 13g and 13e are extended to 110°; and the space between the beam portions 13f and 13g and the space between the beam portions 13e and 13d are extended to 70°; and therefore, they do not exist in the same plane.

In this knuckle, the bending strength, at the direction in which the space is narrow, is strong. Accordingly, by the forging method, when the bending strength is strong in a particular direction, it is possible to adjust the angles between each of the beam portions portion to achieve the desired condition.

Fourth Preferred Embodiment

Also in a Fourth Preferred Embodiment, the knuckle of ??? is formed by the forging method.

Figure 9A:
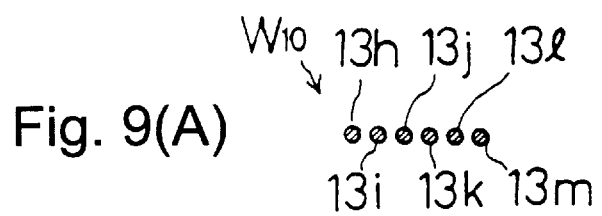
FIG. 9 relates to a knuckle in a Fourth Preferred Embodiment: (A) is an end face view after the forging in the same way as that of FIG. 3; and (B) is an end face view after deburring in the same way as that of FIG. 3.
Figure 9B:
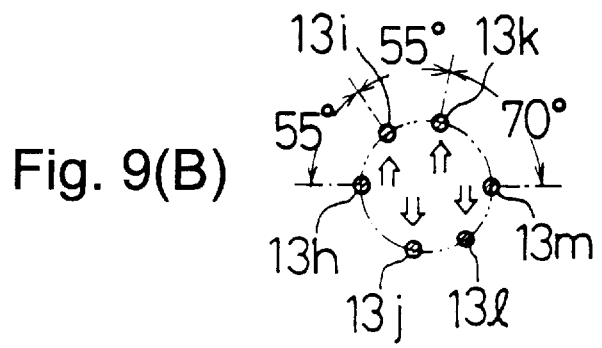

Undergoing the same forging process and the deburring process as the First Preferred Embodiment, a deburred product $W_{10}$, shown in FIG. 9 (A), was obtained. This deburred product $W_{10}$ comprises six sticks of beam portions 13h to 13m. The other portions of the connecting portions 11 and 12 and the communicating portion 13 are not shown in Figures.

Next, undergoing the same bending process and cutting process as the First Preferred Embodiment, a knuckle, shown in FIG. 9 (B), was obtained. In this knuckle, the beam portions 13i, 13j, 13k and 13l are bent toward the arrow directions respectively so that the space between the beam portions 13h and 13i, the space between the beam portions 13i and 13k, the space between the beam portions 13m and 13l and the space between the beam portions 13l and 13j are extended to 55°; and the space between the beam portions 13*k* and 13*m* and the space between the beam portions 13*j* and 13*h* are extended to 70°; and therefore, they do not exist in the same plane.

In this knuckle of the Fourth Preferred Embodiment, the same effects as described in the Third Preferred Embodiment are obtained.

Fifth Preferred Embodiment

In a knuckle of a Fifth Preferred Embodiment, as shown in FIG. 10, each of beam portions 13*n* to 13*p* are molded in sluice shape. The forging method thereof and the other constructions are the same as those of the First Preferred Embodiment.

Also in this knuckle, the same effects as the First Preferred Embodiment are obtained. Accordingly, the shapes of each beam portion has a high degree of freedom so that they can be forged to obtain arbitrary shapes that are suitable for bending strength.

Sixth Preferred Embodiment

A knuckle of a Sixth Preferred Embodiment, as shown in FIG. 11, is molded so that each of beam portions 13*q* to 13*s* are formed in a +(i.e., a cross) shape. The forging method and the other constructions are the same the First Preferred Embodiment.

Also in this knuckle of the Sixth Preferred Embodiment, the same effects as those of the First Preferred Embodiment can be obtained.

Having now fully described the present invention, it will be apparent to one of ordinary skill in the art that many changes and modifications can be made thereto without departing from the spirit or scope of the present invention as set forth herein including the appended claims.

We claim:

1. An arm comprising:
    at least two connecting portions connectable to a vehicle suspension; and
    a communicating portion that communicates each of said at least two connecting portions along communicating directions, said communicating portion receiving a bending force and having at least three beam portions that extend along each communicating direction and do not occupy the same plane.

2. A process for forging an arm comprising the steps of:
    forming at least two connecting portions that are connectable to a vehicle suspension and a communicating portion that communicates each of said at least two connecting portions, said communicating portion being formed with at least three beam portions extending along a communicating direction; and
    bending said at least three beam portions of said communicating portion such that said at least three beam portions do not occupy the same plane.

3. An arm according to claim 1, wherein a space between said at least three beam portions is equal.

4. An arm according to claim 1, wherein a space between an adjacent pair of said at least three beam portions is approximately 120°.

5. An arm according to claim 1, wherein a space between an adjacent pair of said at least three beam portions is approximately 110°.

6. An arm according to claim 1, wherein a space between an adjacent pair of said at least three beam portions is approximately 70°.

7. An arm according to claim 1, wherein a space between an adjacent pair of said at least three beam portions is approximately 55°.

8. An arm according to claim 1, wherein said communicating portion has three beam portions.

9. An arm according to claim 1, wherein said communicating portion has four beam portions.

10. An arm according to claim 1, wherein said communicating portion has six beam portions.

11. An arm according to claim 1, wherein said at least three beam portions are sluice shaped.

12. An arm according to claim 1, wherein said at least three beam portions have a cylindrical shape.

13. An arm according to claim 1, wherein said at least three beam portions are cross shaped.

14. A process according to claim 2, wherein forming includes forming said at least three beam portions in approximately the same plane, wherein adjacent beam portions are attached to each other.

15. A process according to claim 14, wherein bending includes separating said adjacent beam portions from each other.

16. A process according to claim 2, wherein forming includes forming three beam portions and bending includes bending said three beam portions such that said three beam portions are equally spaced.

17. A process according to claim 2, wherein bending includes bending said at least three beam portions such that an adjacent pair of said at least three beam portions are spaced by approximately 70°.

18. A process according to claim 2, further comprising a step of deburring the forged arm after the step of forming.

19. A process according to claim 2, further comprising a step of forming bolt holes in the forged arm after the step of bending.

20. A process according to claim 2, wherein bending includes bending said at least three beam portions by bending pressure.

* * * * *